(12) United States Patent
Huang (10) Patent No.: US 9,818,561 B2
(45) Date of Patent: Nov. 14, 2017

(54) CLUTCH MECHANISM FOR ENERGY STORAGE DEVICE IN GAS INSULATED CIRCUIT BREAKER AND GAS INSULATED CIRCUIT BREAKER THEREOF

(71) Applicant: Siemens Aktiengesellschaft, Munich (DE)

(72) Inventor: Guo Qiang Huang, Guangzhou (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/108,799

(22) PCT Filed: Mar. 25, 2015

(86) PCT No.: PCT/EP2015/056370
§ 371 (c)(1),
(2) Date: Jun. 29, 2016

(87) PCT Pub. No.: WO2015/150182
PCT Pub. Date: Oct. 8, 2015

(65) Prior Publication Data
US 2017/0084409 A1 Mar. 23, 2017

(30) Foreign Application Priority Data

Mar. 31, 2014 (CN) .......................... 2014 1 0126376

(51) Int. Cl.
*H01H 33/28* (2006.01)
*H01H 33/42* (2006.01)
(Continued)

(52) U.S. Cl.
CPC ............. *H01H 33/28* (2013.01); *F16D 43/26* (2013.01); *H01H 3/3021* (2013.01);
(Continued)

(58) Field of Classification Search
CPC ........ H01H 33/28; H01H 33/42; H01H 33/58; H01H 33/38; H01H 3/30; H01H 3/32;
(Continued)

(56) References Cited

U.S. PATENT DOCUMENTS

| 1,383,525 A | * | 7/1921 | Carroll | ..................... F16D 43/26 |
| | | | | 192/139 |
| 1,554,718 A | * | 9/1925 | Dryer | ....................... H01H 3/30 |
| | | | | 335/77 |

(Continued)

FOREIGN PATENT DOCUMENTS

| AU | 2270377 A | 8/1978 |
| CN | 1205533 A | 1/1999 |

(Continued)

OTHER PUBLICATIONS

Chinese Office Action dated Sep. 27, 2016.
International Search Report and Written Opinion dated Nov. 9, 2015.

*Primary Examiner* — Renee Luebke
*Assistant Examiner* — William Bolton
(74) *Attorney, Agent, or Firm* — Harness, Dickey & Pierce, P.L.C.

(57) ABSTRACT

A clutch mechanism includes a transmission shaft, driven by an output shaft of a motive power device; a clutch element, including an engagement end, in unidirectional transmission connection with the transmission shaft, and a meshing end; a push rod, passing through the clutch element and including a contact end and a fixed end connected to the transmission shaft; a gear shaft, including a transmission gear in transmission connection with the meshing end; a rotary element, surrounding the gear shaft in a rotatable fashion and including a transmission end and a drive end; and a restoring element, one end bearing against the transmission shaft and another end bearing against the output shaft; and a drive (Continued)

gear, in transmission connection with the gear shaft and provided in a circumferential direction with a drive portion capable of pushing the transmission end. A gas insulated circuit breaker including clutch mechanism is also disclosed.

20 Claims, 6 Drawing Sheets (51) Int. Cl.
*H01H 3/30* (2006.01)
*F16D 43/26* (2006.01)

(52) U.S. Cl.
CPC ......... *H01H 33/42* (2013.01); *F16D 2300/24* (2013.01); *H01H 2235/01* (2013.01)

(58) Field of Classification Search
CPC .... H01H 3/28; H01H 3/3021; H01H 2235/01; F16D 43/26; F16D 11/02; F16D 71/00; F16H 1/06

USPC ............ 218/154, 78, 84, 140, 153; 74/10.6, 74/53–55, 838, 107, 122, 125, 557
See application file for complete search history.

(56) References Cited

U.S. PATENT DOCUMENTS

| | | | |
|---|---|---|---|
| 2,915,160 A | | 12/1959 | Schneider |
| 2,972,259 A | * | 2/1961 | Favre .................... G05G 25/00 185/39 |
| 5,981,889 A | * | 11/1999 | Niklaus .................... H01H 3/30 200/501 |
| 6,064,021 A | * | 5/2000 | Wehrli .................... H01H 3/30 200/400 |
| 6,667,452 B2 | * | 12/2003 | Spiegel .................... H01H 3/30 200/501 |

FOREIGN PATENT DOCUMENTS

| | | |
|---|---|---|
| CN | 102412074 A | 4/2012 |
| FR | 1057635 A | 3/1954 |
| WO | WO 2013041050 A1 | 3/2013 |

* cited by examiner

CLUTCH MECHANISM FOR ENERGY STORAGE DEVICE IN GAS INSULATED CIRCUIT BREAKER AND GAS INSULATED CIRCUIT BREAKER THEREOF

PRIORITY STATEMENT

This application is the national phase under 35 U.S.C. §371 of PCT International Application No. PCT/EP2015/056370 which has an International filing date of Mar. 25, 2015, which designated the United States of America and which claims priority to Chinese patent application number 201410126376.7 filed Mar. 31, 2014, the entire contents of which are hereby incorporated herein by reference.

FIELD

At least one embodiment of the present invention generally relates to a clutch mechanism, in particular to a clutch mechanism for an energy storage device in a gas insulated circuit breaker. In addition, at least one embodiment of the present invention also generally relates to a gas insulated circuit breaker using such a clutch mechanism.

BACKGROUND

Many types of energy storage devices need to work in cooperation with a clutch mechanism, in order to accumulate energy and release energy when required. These energy storage devices may for example rely on springs to accumulate potential energy, and when accumulation of energy is complete, a clutch mechanism can be put into an unlocked state to release energy.

Many existing gas insulated circuit breakers for high voltage power transmission employ an energy storage device and a clutch mechanism cooperating therewith; when in a locked state, the clutch mechanism enables the energy storage device to accumulate and store energy. When the clutch mechanism is in an unlocked state, a motive power device separates mechanically from the energy storage device, thereby allowing the energy accumulated in the energy storage device to be released, so that the potential energy stored in the energy storage device is converted to kinetic energy, to drive an actuating mechanism in the gas insulated circuit breaker to open or close the circuit in which the gas insulated circuit breaker is connected.

An existing type of clutch mechanism takes the form of a ratchet mechanism, in which a ratchet and a pawl cooperate with one another; in the locked state, the ratchet can only rotate in one direction as energy is accumulated, so that the accumulated energy will not be lost. When energy accumulation by the energy storage device is complete, the pawl will achieve mechanical separation of the motive power device from the energy storage device with an arcuate surface on the ratchet, so as to release the accumulated energy.

SUMMARY

At least one embodiment of the present invention provides a clutch mechanism for an energy storage device in a gas insulated circuit breaker, which enables convenient and reliable mechanical separation of a motive power device and the energy storage device upon completion of energy storage, and has a lower transmission torque and a lower cost.

At least one embodiment of the present invention provides a gas insulated circuit breaker using the clutch mechanism.

At least one embodiment of the present invention provides a clutch mechanism for an energy storage device in a gas insulated circuit breaker, comprising: a transmission shaft, driven by an output shaft of a motive power device; a clutch element, having an engagement end which can be in unidirectional transmission connection with the transmission shaft, and a meshing end; a push rod, which passes through the clutch element and has a contact end and a fixed end that is connected to the transmission shaft; a gear shaft, comprising a transmission gear which can be in transmission connection with the meshing end; a rotary element, which surrounds the gear shaft in a rotatable fashion and has a transmission end and a drive end, the drive end being able to push the contact end; and a restoring element, with one end bearing against the transmission shaft, and the other end bearing against the output shaft, a restoring force produced by the restoring element tending to keep the transmission shaft in transmission connection with the engagement end; a drive gear, which is in transmission connection with the gear shaft and is provided in a circumferential direction with a drive portion capable of pushing the transmission end, the drive portion being capable of pushing the rotary element to rotate around the gear shaft such that the drive end pushes the contact end.

At least one embodiment of the present invention also provides a gas insulated circuit breaker, comprising a motive power device, an energy storage device and a clutch mechanism as described above, wherein the transmission shaft is connected to the motive power device, and the drive gear is connected to the energy storage device.

BRIEF DESCRIPTION OF THE DRAWINGS

The accompanying drawings below merely illustrate and explain the present invention schematically, without defining the scope thereof.

KEY TO LABELS

10 transmission shaft
12 output shaft
14 spring
16 connecting plate
20 clutch element
22 engagement end
24 meshing end
30 push rod
32 contact end
34 fixed end
40 gear shaft
42 transmission gear
50 rotary element
52 transmission end
54 drive end
60 drive gear 62 drive portion
70 limiter
72 limiting end
80 restoring spring
90 intermediate gear shaft
92 intermediate gear
94 gear portion
96 energy store
98 motive power device
100 gas insulated circuit breaker.

DETAILED DESCRIPTION OF EXAMPLE EMBODIMENTS

At least one embodiment of the present invention provides a clutch mechanism for an energy storage device in a gas insulated circuit breaker, comprising: a transmission shaft, driven by an output shaft of a motive power device; a clutch element, having an engagement end which can be in unidirectional transmission connection with the transmission shaft, and a meshing end; a push rod, which passes through the clutch element and has a contact end and a fixed end that is connected to the transmission shaft; a gear shaft, comprising a transmission gear which can be in transmission connection with the meshing end; a rotary element, which surrounds the gear shaft in a rotatable fashion and has a transmission end and a drive end, the drive end being able to push the contact end; and a restoring element, with one end bearing against the transmission shaft, and the other end bearing against the output shaft, a restoring force produced by the restoring element tending to keep the transmission shaft in transmission connection with the engagement end; a drive gear, which is in transmission connection with the gear shaft and is provided in a circumferential direction with a drive portion capable of pushing the transmission end, the drive portion being capable of pushing the rotary element to rotate around the gear shaft such that the drive end pushes the contact end.

In a schematic embodiment of the clutch mechanism of at least one embodiment of the present invention, the unidirectional transmission connection between the transmission shaft and the engagement end is realized via a jaw clutch.

In another schematic embodiment of the clutch mechanism of at least one embodiment of the present invention, the transmission shaft comprises a connecting plate fixed to an inner peripheral surface thereof, the fixed end being connected to the connecting plate.

In another schematic embodiment of the clutch mechanism of at least one embodiment of the present invention, the restoring element is a spring, with one end bearing against the connecting plate of the transmission shaft, and the other end bearing against the output shaft.

In another schematic embodiment of the clutch mechanism of at least one embodiment of the present invention, the meshing end is a bevel gear capable of meshing with the transmission gear.

In another schematic embodiment of the clutch mechanism of at least one embodiment of the present invention, also included are: a limiter having a limiting end, the transmission end being capable of bearing against the limiting end; and a restoring spring, with one end connected to the limiter, and the other end connected to the transmission end, a restoring force produced by the restoring spring tending to hold the transmission end against the limiting end.

In another schematic embodiment of the clutch mechanism of at least one embodiment of the present invention, also included are an intermediate gear shaft and an intermediate gear through which the intermediate gear shaft passes, the intermediate gear being in transmission connection with the gear shaft, and a gear portion of the intermediate gear shaft being in transmission connection with the drive gear.

In another schematic embodiment of the clutch mechanism of at least one embodiment of the present invention, the drive portion is a cylindrical projection.

At least one embodiment of the present invention also provides a gas insulated circuit breaker, comprising a motive power device, an energy storage device and a clutch mechanism as described above, wherein the transmission shaft is connected to the motive power device, and the drive gear is connected to the energy storage device.

Particular embodiments of the present invention are now explained with reference to the accompanying drawings, to furnish a clearer understanding of the technical features, object and effects of the present invention. In the drawings, identical labels indicate identical components.

In this text, "schematic" means "serving as a real instance, example or illustration". No drawing or embodiment described as "schematic" herein should be interpreted as a more preferred or more advantageous technical solution.

So that the drawings may appear uncluttered, only those components relevant to the present invention are shown schematically in the drawings, but these by no means represent the actual structure of the invention as a product. Moreover, to make the drawings uncluttered and easy to understand, in the case of components with the same structure or function in certain drawings, only one of these is drawn schematically, or only one of them is labeled.

In this text, "one" not only means "just this one", but may also mean "more than one".

In this text, "transmission connection" means that one component transfers its rotation or translational motion to another component. Moreover, the "transmission connection" may be direct contact between two components with transfer of motion therebetween, or there may be no direct contact between the two components, with motion being transferred indirectly via another component.

Figure 1:
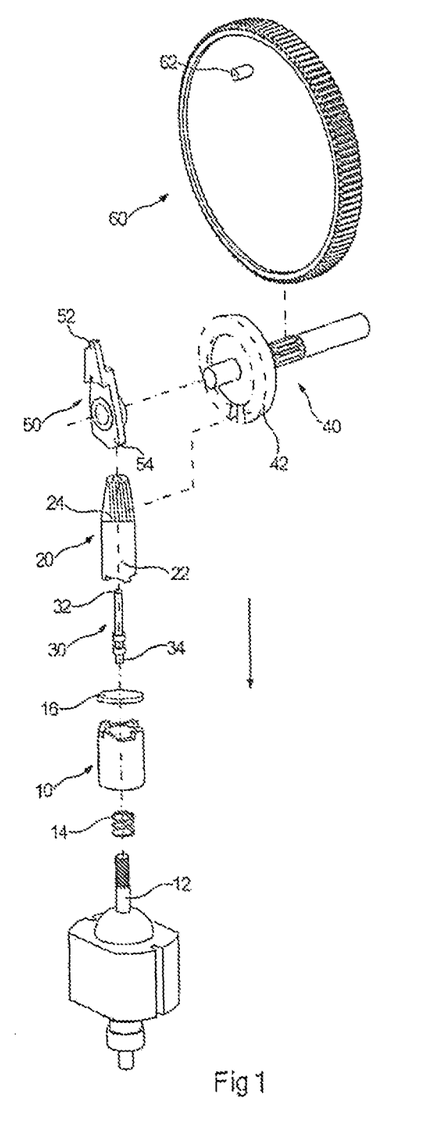
FIG. 1 is a structural schematic diagram illustrating a schematic embodiment of a clutch mechanism for an energy storage device.

FIG. 1 is a structural schematic diagram illustrating a schematic embodiment of a clutch mechanism for an energy storage device in a gas insulated circuit breaker. As FIG. 1 shows, the clutch mechanism for an energy storage device comprises a transmission shaft 10, a clutch element 20, a push rod 30, a gear shaft 40, a rotary element 50, a restoring element 14 and a drive gear 60.

The transmission shaft 10 is connected to an output shaft 12 of a motive power device; the motive power device may for example be an electric motor, and the output shaft may be the output shaft of the electric motor. The transmission shaft 10 may be driven by the output shaft 12 so as to rotate in synchrony therewith.

The clutch element 20 has an engagement end 22 and a meshing end 24. The engagement end 22 can be in unidirectional transmission connection with the transmission shaft 10, such that the transmission shaft 10 can drive the clutch element 20 in unidirectional rotation. The unidirectional transmission connection may be realized via a jaw clutch as shown in FIG. 1, but other arrangements may also be employed. Unidirectional transmission means that the transmission shaft 10 can only drive the clutch element 20 to rotate in one fixed direction; when the transmission shaft 10 changes its direction of rotation, the clutch element 20 will not rotate with the transmission shaft 10.

Figure 4:
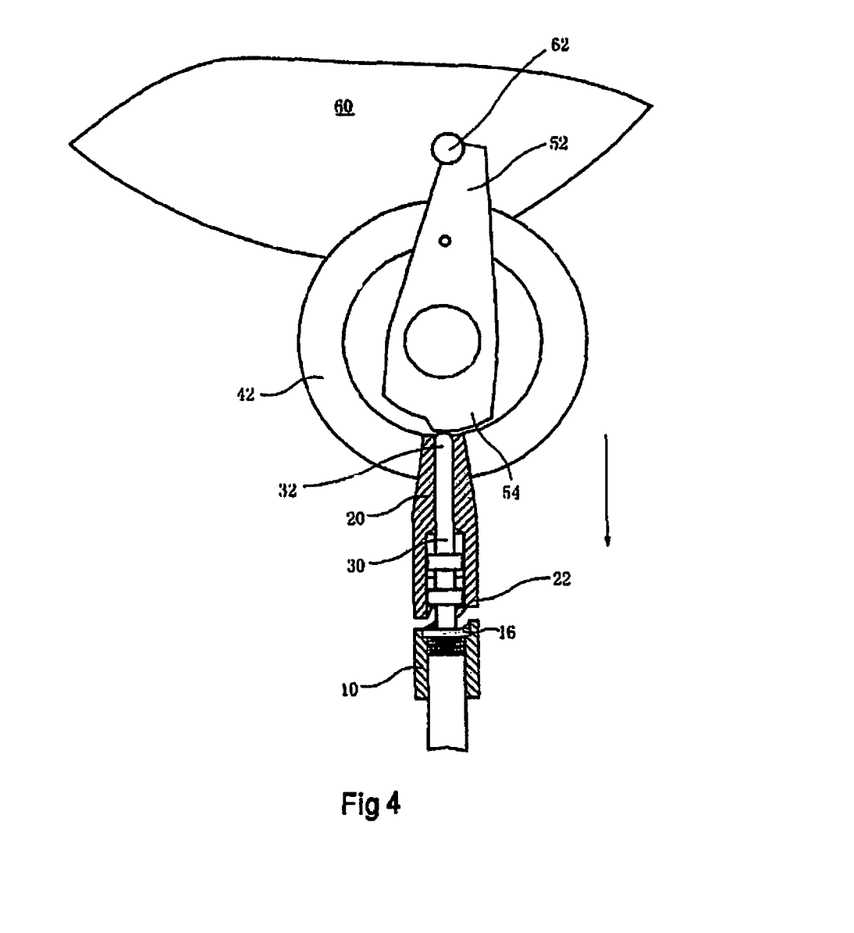

The push rod 30 passes through the clutch element 20, and has a contact end 32 and a fixed end 34. The fixed end 34 is fixed to the transmission shaft 10. Referring to FIGS. 1 and 4, the transmission shaft 10 comprises a connecting plate 16 fixed to an inner peripheral surface thereof, and the fixed end 34 is connected to the connecting plate 16. The push rod 30 can move relative to the clutch element 20 in the engagement/disengagement direction shown by the arrow in FIG. 1. When the push rod 30 moves in the clutch direction shown by the arrow in FIG. 1, the transmission shaft 10 disengages from the engagement end 22; the transmission shaft 10 can continue to rotate, driven by the output shaft 12, but cannot drive the clutch element 20 to rotate. During the engagement/disengagement process of the clutch mechanism for an energy storage device, the transmission shaft 10 moves in its axial direction relative to the clutch element 20, while the clutch element 20 remains in a fixed position in its axial direction.

The gear shaft 40 comprises a transmission gear 42 which can be in transmission connection with the meshing end 24. The transmission gear 42 meshes with the meshing end 24 so that the clutch element 20 can drive the transmission gear 42 to rotate. In a schematic embodiment of the clutch mechanism for an energy storage device, the meshing end 24 is a bevel gear. The use of a bevel gear makes the direction of the rotation axis of the clutch element 20 perpendicular to the direction of the rotation axis of the transmission gear 42.

The rotary element 50 is connected to the axis of the rotation shaft of the gear shaft 40; moreover, the rotary element 50 surrounds the gear shaft 40 in a rotatable fashion, and can rotate relative to the axis of the gear shaft 40. The rotary element 50 has a transmission end 52 and a drive end 54. When the rotary element 50 rotates relative to the axis of the transmission gear 42, the drive end 54 can push the contact end 32 in contact therewith, and via the contact end 32 push the push rod 30 to move in the engagement/disengagement direction shown by the arrow in FIG. 1.

Figure 2:
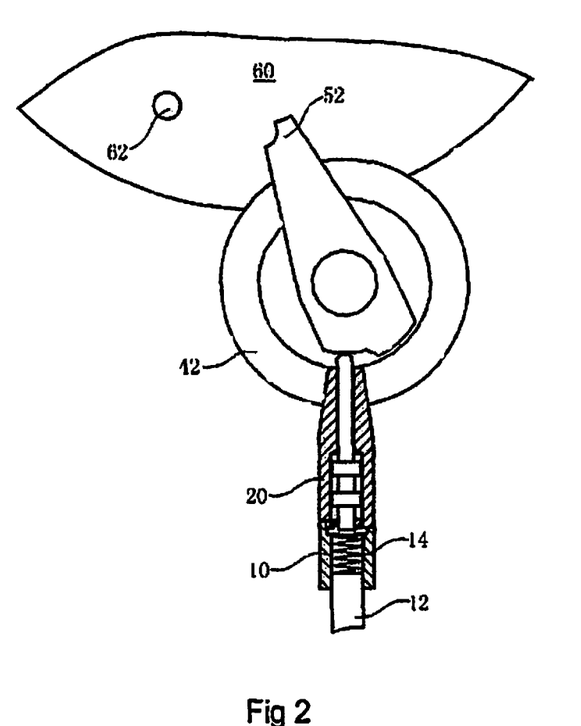
FIGS. 2 to 4 illustrate the process of operation of the clutch mechanism for an energy storage device.

Referring to FIGS. 1 and 2, the restoring element 14 is a spring, with one end bearing against the connecting plate 16 of the transmission shaft 10, and the other end bearing against the output shaft 12. The restoring force produced by the spring tends to keep the transmission shaft 10 in transmission connection with the engagement end 22. The direction of the restoring force is opposite the engagement/disengagement direction shown by the arrow in FIG. 1.

Once the drive end 54 breaks contact with the contact end 32 and the energy stored in the energy storage device is released, the transmission shaft 10 can re-establish the transmission connection with the engagement end 22 under the action of the restoring force, and the transmission shaft 10 drives the clutch element 20 to rotate. The restoring element 14 may not only be a spring, but also another component capable of producing a suitable restoring force, for example a component made of an elastic material. The drive gear 60 may be in transmission connection with the gear shaft 40.

In the embodiment shown in FIG. 1, the transmission connection between the drive gear 60 and the gear shaft 40 is accomplished by way of external meshing. The drive gear 60 is provided with a drive portion 62 in a circumferential direction. In the embodiment shown in FIG. 1, the drive portion 62 is a cylindrical projection. During rotation of the drive gear 60, the drive portion 62 may contact the transmission end 52; when the drive portion 62 contacts the transmission end 52, the drive portion 62 can push the rotary element 50 to rotate around the gear shaft 40, so that the drive end 54 pushes the contact end 32. The structure described above results in the clutch mechanism of the present invention having a low transmission torque and high reliability, with low costs.

Figure 3:
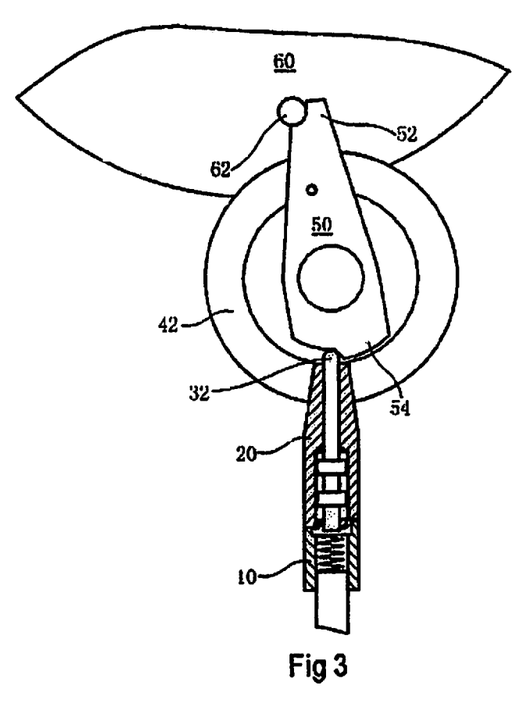

FIGS. 2 to 4 illustrate the process of operation of the clutch mechanism for an energy storage device. As FIG. 2 shows, the transmission shaft 10 drives the clutch element 20 to rotate. The clutch element 20 drives the transmission gear 42 to rotate. The transmission gear 42 drives the drive gear 60 to rotate (e.g. anti-clockwise), in order to perform the process of energy storage in the energy storage device. The rotation of the drive gear 60 also drives the drive portion 62 to rotate towards the transmission end 52; at the instant shown in FIG. 2, the drive portion 62 has not yet contacted the transmission end 52.

The drive gear 60 drives the drive portion 62 to continue to rotate towards the transmission end 52. As FIG. 3 shows, the drive portion 62 contacts the transmission end 52, and the rotation of the drive gear 60 is transferred to the rotary element 50 via the drive portion 62, such that the rotary element 50 rotates clockwise relative to the axis of the transmission gear 42, and the drive end 54 begins to contact the contact end 32. At this time, the transmission shaft 10 drives the clutch element 20 to rotate. The clutch element 20 drives the transmission gear 42 to rotate. The transmission gear 42 drives the drive gear 60 to rotate anti-clockwise, and the process of energy storage in the energy storage device continues.

As FIG. 4 shows, the rotation of the drive gear 60 is transferred to the rotary element 50 via the drive portion 62. After contacting the contact end 32, the drive end 54 begins to push the contact end 32 in the engagement/disengagement direction shown by the arrow in FIG. 4, thereby converting the rotation of the rotary element 50 to translational motion of the push rod 30 in the engagement/disengagement direction shown by the arrow in FIG. 4. The translational motion of the push rod 30 in the engagement/disengagement direction shown by the arrow in FIG. 4 pushes the transmission shaft 10, so that the transmission shaft 10 moves in the engagement/disengagement direction shown by the arrow in FIG. 4, and thereby disengages from the engagement end 22.

Once the transmission shaft 10 has disengaged from the engagement end 22, the rotation of the transmission shaft 10 cannot be transferred to the clutch element 20, so that the transmission gear 42 and drive gear 60 stop rotating, and the process of energy storage in the energy storage device ends. When the gas insulated circuit breaker is triggered to open a power supply circuit, the energy stored in the energy storage device is released, and the drive gear 60 continues to rotate anti-clockwise; when the drive end 54 breaks contact with the contact end 32, the restoring force produced by the restoring element (e.g. spring) re-establishes the transmission connection between the transmission shaft 10 and engagement end 22, so that the torque outputted by the output shaft 12 is transferred to the drive gear 60 again.

Figure 5:
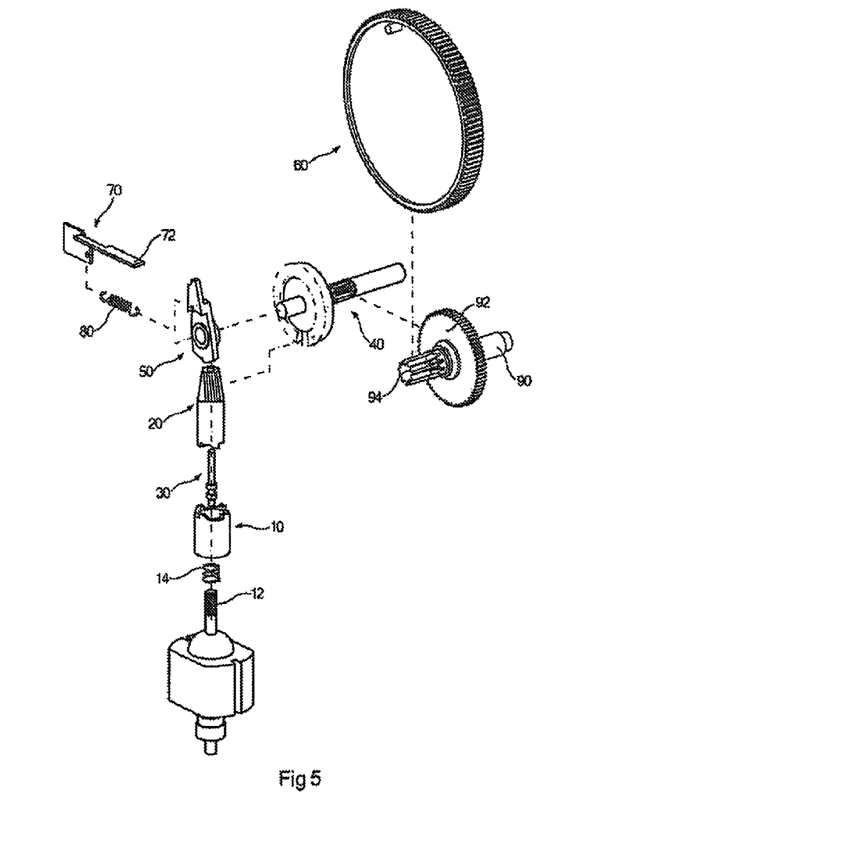
FIG. 5 is a structural schematic diagram illustrating another schematic embodiment of a clutch mechanism for an energy storage device.

FIG. 5 is a structural schematic diagram illustrating another schematic embodiment of a clutch mechanism for an energy storage device. As FIG. 5 shows, the clutch mechanism comprises a limiter 70 and a restoring spring 80. The limiter 70 has a limiting end 72. One end of the restoring spring 80 is connected to the limiter 70, while the other end of the restoring spring 80 is connected to the transmission end 52. The elastic restoring force produced by the restoring spring 80 tends to hold the transmission end 52 against the limiting end 72. When the drive portion 62 is not in contact with the transmission end 52, the transmission end 52 can bear against the limiting end 72, under the action of the elastic restoring force of the restoring spring 80. When the drive portion 62 drives the rotary element 50 to rotate, the restoring spring 80 is stretched.

As FIG. 5 shows, in a schematic embodiment of a clutch mechanism for an energy storage device, the clutch mechanism comprises an intermediate gear shaft 90. The intermediate gear shaft 90 is provided with an intermediate gear 92 through which the intermediate gear shaft 90 passes, and a gear portion 94. The intermediate gear 92 meshes with the gear shaft 40, and the gear portion 94 meshes with the drive gear 60. The intermediate gear 92 and gear portion 94 are both straight-toothed cylindrical gears, and mesh externally with the gear shaft 40 and drive gear 60, respectively. A unidirectional overrunning clutch (not shown in the figure) is provided between the intermediate gear 92 and gear portion 94; during the process of releasing energy stored in the energy storage device, the drive gear 60 rotates at high speed, and only drives the gear portion 94 to rotate, with no rotation of any other gear.

Figure 6:
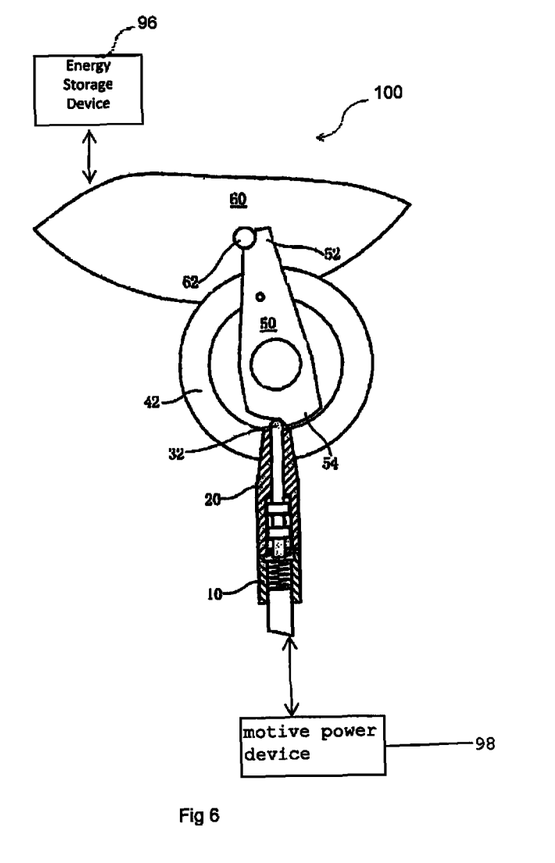
FIG. 6 is a diagram illustrating an embodiment of a gas insulated circuit breaker including the clutch mechanism of an embodiment; a motive power device; and an energy storage device.

An embodiment of the present invention shown in FIG. 6 provides a gas insulated circuit breaker 100, comprising a motive power device 98, an energy storage device 96 and a clutch mechanism as described above, wherein the transmission shaft 10 is connected to the motive power device 98, and the drive gear 60 is connected to the energy storage device 96.

It should be understood that although the present invention is described in terms of various embodiments herein, it is by no means the case that each embodiment contains only one independent technical solution; such a manner of presentation is adopted herein purely for the sake of clarity. Those skilled in the art should consider the description in its entirety. The technical solutions in the various embodiments may also be suitably combined to form other embodiments capable of being understood by those skilled in the art.

The series of detailed explanations set out above are merely specific explanations of feasible embodiments of the present invention, and are not intended to limit the scope of protection thereof. All equivalent embodiments or alterations made without departing from the artistic spirit of the present invention, such as combinations, divisions or repetitions of features, should be included in the scope of protection of the present invention.

The invention claimed is:

1. A clutch mechanism for an energy storage device in a gas insulated circuit breaker, comprising:
a transmission shaft, drivable by an output shaft of a motive power device;
a clutch element, including an engagement end, unidirectional transmission connectable with the transmission shaft, and a meshing end;
a push rod, passing through the clutch element, including a contact end and including a fixed end connected to the transmission shaft;
a gear shaft, including a transmission gear transmission connectable with the meshing end;
a rotary element, surrounding the gear shaft in a rotatable fashion and including a transmission end and a drive end, the drive end being configured to push the contact end; and
a restoring element, including one end bearing against the transmission shaft and another end bearing against the output shaft, configured to produce a restoring force to tend to keep the transmission shaft in transmission connection with the engagement end; and
a drive gear, in transmission connection with the gear shaft and provided in a circumferential direction with a drive portion configured to push the transmission end, the drive portion being configured to push the rotary element to rotate around the gear shaft such that the drive end is configured to push the contact end.

2. The clutch mechanism of claim 1, wherein the unidirectional transmission connection between the transmission shaft and the engagement end is realized via a jaw clutch.

3. The clutch mechanism of claim 2, wherein the transmission shaft includes a connecting plate fixed to an inner peripheral surface of the transmission shaft, the fixed end being connected to the connecting plate.

4. The clutch mechanism of claim 3, wherein the restoring element is a spring, one end of the spring bearing against the connecting plate of the transmission shaft, and another end of the spring bearing against the output shaft.

5. A gas insulated circuit breaker, comprising:
a motive power device;
an energy storage device; and
the clutch mechanism of claim 2, wherein the transmission shaft is connected to the motive power device, and the drive gear is connected to the energy storage device.

6. The clutch mechanism of claim 1, wherein the transmission shaft includes a connecting plate fixed to an inner peripheral surface of the transmission shaft, the fixed end being connected to the connecting plate.

7. The clutch mechanism of claim 6, wherein the restoring element is a spring, one end of the spring bearing against the connecting plate of the transmission shaft, and another end of the spring bearing against the output shaft.

8. A gas insulated circuit breaker, comprising:
a motive power device;
an energy storage device; and
the clutch mechanism of claim 7, wherein the transmission shaft is connected to the motive power device, and the drive gear is connected to the energy storage device.

9. A gas insulated circuit breaker, comprising:
a motive power device;
an energy storage device; and
the clutch mechanism of claim 6, wherein the transmission shaft is connected to the motive power device, and the drive gear is connected to the energy storage device.

10. The clutch mechanism of claim 1, wherein the meshing end is a bevel gear configured to mesh with the transmission gear.

11. A gas insulated circuit breaker, comprising:
a motive power device;
an energy storage device; and
the clutch mechanism of claim 10, wherein the transmission shaft is connected to the motive power device, and the drive gear is connected to the energy storage device.

12. The clutch mechanism of claim 1, further comprising:
a limiter including a limiting end, the transmission end being configured to bear against the limiting end; and
a restoring spring, one end of the restoring spring being connected to the limiter and another end of the restoring spring connected to the transmission end, the restoring spring being configured to exert a restoring force tending to hold the transmission end against the limiting end.

13. The clutch mechanism of claim 12, further comprising:
an intermediate gear shaft; and
an intermediate gear, through which the intermediate gear shaft passes, the intermediate gear being in transmission connection with the gear shaft, and a gear portion of the intermediate gear shaft being in transmission connection with the drive gear.

14. A gas insulated circuit breaker, comprising:
a motive power device;
an energy storage device; and
the clutch mechanism of claim 13, wherein the transmission shaft is connected to the motive power device, and the drive gear is connected to the energy storage device.

15. A gas insulated circuit breaker, comprising:
a motive power device;
an energy storage device; and
the clutch mechanism of claim 12, wherein the transmission shaft is connected to the motive power device, and the drive gear is connected to the energy storage device.

16. The clutch mechanism of claim 1, further comprising:
an intermediate gear shaft; and
an intermediate gear, through which the intermediate gear shaft passes, the intermediate gear being in transmission connection with the gear shaft, and a gear portion of the intermediate gear shaft being in transmission connection with the drive gear.

17. A gas insulated circuit breaker, comprising:
a motive power device;
an energy storage device; and
the clutch mechanism of claim 16, wherein the transmission shaft is connected to the motive power device, and the drive gear is connected to the energy storage device.

18. The clutch mechanism of claim 1, wherein the drive portion is a cylindrical projection.

19. A gas insulated circuit breaker, comprising:
a motive power device;
an energy storage device; and
the clutch mechanism of claim 8, wherein the transmission shaft is connected to the motive power device, and the drive gear is connected to the energy storage device.

20. A gas insulated circuit breaker, comprising:
a motive power device;
an energy storage device; and
the clutch mechanism of claim 1, wherein the transmission shaft is connected to the motive power device, and the drive gear is connected to the energy storage device.

* * * * *